US012724377B2

(12) United States Patent
Juri et al.

(10) Patent No.: US 12,724,377 B2
(45) Date of Patent: Sep. 1, 2026

(54) IMAGE FORMING APPARATUS AND PROCESS CARTRIDGE INCLUDING A CLEANING BLADE WITH A COATING LAYER

(71) Applicants: Keiichiro Juri, Tokyo (JP); Masahiro Ohmori, Kanagawa (JP); Hideki Kimura, Kanagawa (JP)

(72) Inventors: Keiichiro Juri, Tokyo (JP); Masahiro Ohmori, Kanagawa (JP); Hideki Kimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/037,684

(22) Filed: Jan. 27, 2025

(65) Prior Publication Data

US 2025/0244707 A1 Jul. 31, 2025

(30) Foreign Application Priority Data

Jan. 29, 2024 (JP) ................................ 2024-010730

(51) Int. Cl.
*G03G 21/00* (2006.01)
*G03G 21/18* (2006.01)

(52) U.S. Cl.
CPC ..... *G03G 21/0017* (2013.01); *G03G 21/0029* (2013.01); *G03G 21/1814* (2013.01)

(58) Field of Classification Search
USPC ........................................................ 399/350
See application file for complete search history.

(56) References Cited

U.S. PATENT DOCUMENTS

2003/0081971 A1* 5/2003 Nakayama ......... G03G 21/0011 399/350
2014/0205338 A1 7/2014 Gondoh et al.
(Continued)

FOREIGN PATENT DOCUMENTS

JP H06-348193 A 12/1994
JP H07-306616 A 11/1995
(Continued)

OTHER PUBLICATIONS

European Search Report issued May 22, 2025 in European Patent Application No. 25154569.5, 11 pages.
(Continued)

*Primary Examiner* — Quana Grainger
(74) *Attorney, Agent, or Firm* — XSENSUS LLP

(57) ABSTRACT

An image forming apparatus includes an image bearer, a charging device, an irradiator, a developing device, a transfer device, a fixing device, and a cleaning device that includes a cleaning blade including an elastic cleaning blade substrate including the front end portion to clean the surface of the image bearer, the front edge ridge part, the undersurface, an edge layer, a coating layer disposed on the front end portion, the coating layer being in contact with the surface of the image bearer to clean the surface of the image bearer, and a cleaning blade supporting member, wherein the maximum penetration depth hmax of the indenter of a microhardness tester is between 4.0 μm and 10.0 μm at a position 100 μm inward from the front edge ridge part on the undersurface of the elastic cleaning blade substrate as measured according to a nanoindentation hardness test.

20 Claims, 6 Drawing Sheets

(56) References Cited

U.S. PATENT DOCUMENTS

| | | | |
|---|---|---|---|
| 2017/0003643 | A1 | 1/2017 | Aoyama et al. |
| 2022/0221817 | A1 | 7/2022 | Juri et al. |
| 2022/0317601 | A1 | 10/2022 | Aoki et al. |
| 2023/0061068 | A1 | 3/2023 | Goto et al. |
| 2023/0103454 | A1 | 4/2023 | Kikuchi et al. |
| 2023/0236536 | A1 | 7/2023 | Ohmori et al. |
| 2023/0384730 | A1 | 11/2023 | Shimada et al. |
| 2024/0053700 | A1 | 2/2024 | Ohmori et al. |
| 2024/0152085 | A1 | 5/2024 | Juri et al. |
| 2024/0255889 | A1 | 8/2024 | Ohmori et al. |
| 2024/0255890 | A1 | 8/2024 | Goto et al. |

FOREIGN PATENT DOCUMENTS

| | | | |
|---|---|---|---|
| JP | H08-220962 | A | 8/1996 |
| JP | H09-258632 | A | 10/1997 |
| JP | H10-214009 | A | 8/1998 |
| JP | 2000-147972 | A | 5/2000 |
| JP | 2004-101551 | A | 4/2004 |
| JP | 2017-016083 | A | 1/2017 |
| JP | 2019-109495 | A | 7/2019 |
| JP | 2021-170052 | A | 10/2021 |
| JP | 2022-107347 | A | 7/2022 |
| JP | 2022-124440 | A | 8/2022 |
| JP | 2023-109394 | A | 8/2023 |
| WO | 2022/172111 | A1 | 8/2022 |

OTHER PUBLICATIONS

U.S. Appl. No. 18/650,335, filed Apr. 30, 2024.
U.S. Appl. No. 18/665,918, filed May 16, 2024.

* cited by examiner

IMAGE FORMING APPARATUS AND PROCESS CARTRIDGE INCLUDING A CLEANING BLADE WITH A COATING LAYER

CROSS-REFERENCE TO RELATED APPLICATIONS

This patent application is based on and claims priority pursuant to 35 U.S.C. § 119 to Japanese Patent Application No. 2024-010730, filed on Jan. 29, 2024, in the Japan Patent Office, the entire disclosure of which is hereby incorporated by reference herein.

BACKGROUND

Technical Field

The present disclosure is related to an image forming apparatus and a process cartridge.

Description of the Related Art

In electrophotographic image forming apparatuses, residual toner adhering to the surface of an image bearer—sometimes referred to as the cleaning target—is typically removed using a cleaning mechanism after the toner image is transferred to the recording medium or intermediate transfer body during the image forming process.

As the cleaning mechanism, a cleaning blade is employed due to its simple structure and excellent cleaning performance. Such a cleaning blade typically includes an elastic member made of materials such as polyurethane rubber and a supporting member. The base end of the elastic member is supported by the supporting member, and the contact portion (front end ridge part) of the elastic member is pressed against the surface of the image bearer. This contact allows the residual toner on the surface of the image bearer to be blocked and scraped off for removal.

In cleaning mechanisms that use a cleaning blade, friction occurs between the cleaning blade and the image bearer. This friction can lead to an increase in the torque required to rotate the image bearer, potentially causing it to stall. Additionally, the abrasion caused by the sliding contact between the cleaning blade and the image bearer can result in wear at the contact portion, leading to curling of the contact edge. Toner may escape through the curled portion, resulting in cleaning defects.

SUMMARY

According to embodiments of the present disclosure, an image forming apparatus is provided which includes an image bearer, a charging device to charge the surface of the image bearer, an irradiator to irradiate the surface of the image bearer charged to form a latent electrostatic image, a developing device to develop the latent electrostatic image to form a toner image, a transfer device to transfer the toner image to a recording medium, a fixing device to fix the toner image transferred to the recording medium, and a cleaning device, the cleaning device including a cleaning blade including an elastic cleaning blade substrate including a coating layer on the front end portion of the elastic cleaning blade substrate that is in contact with the surface of the image bearer to clean the surface of the image bearer, the coating layer including the front edge ridge part and a cleaning blade supporting member to support the elastic cleaning blade substrate, wherein the maximum penetration depth hmax of the indenter of a microhardness tester is between 4.0 μm and 10.0 μm at a position 100 μm inward from the front edge ridge part of the coating layer on the undersurface of the elastic cleaning blade substrate as measured according to a nanoindentation hardness test.

As another aspect of embodiments of the present disclosure, a process cartridge includes an image bearer, at least one of a charging device to charge a surface of the image bearer, an irradiator to irradiate the surface of the image bearer charged to form a latent electrostatic image, a developing device to develop the latent electrostatic image to form a toner image, and a transfer device to transfer the toner image to a recording medium, and a cleaning device including, a cleaning device that includes a cleaning blade including an elastic cleaning blade substrate including an elastic member including a front end portion, a front edge ridge part, and an undersurface, a coating layer disposed on the front end portion, the coating layer being in contact with the surface of the image bearer to clean the surface of the image bearer, and a cleaning blade supporting member to support the clastic cleaning blade substrate, wherein the maximum penetration depth hmax of an indenter of a microhardness tester is between 4.0 μm and 10.0 μm at a position 100 μm inward from the front edge ridge part on the undersurface of the elastic cleaning blade substrate as measured according to a nanoindentation hardness test.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
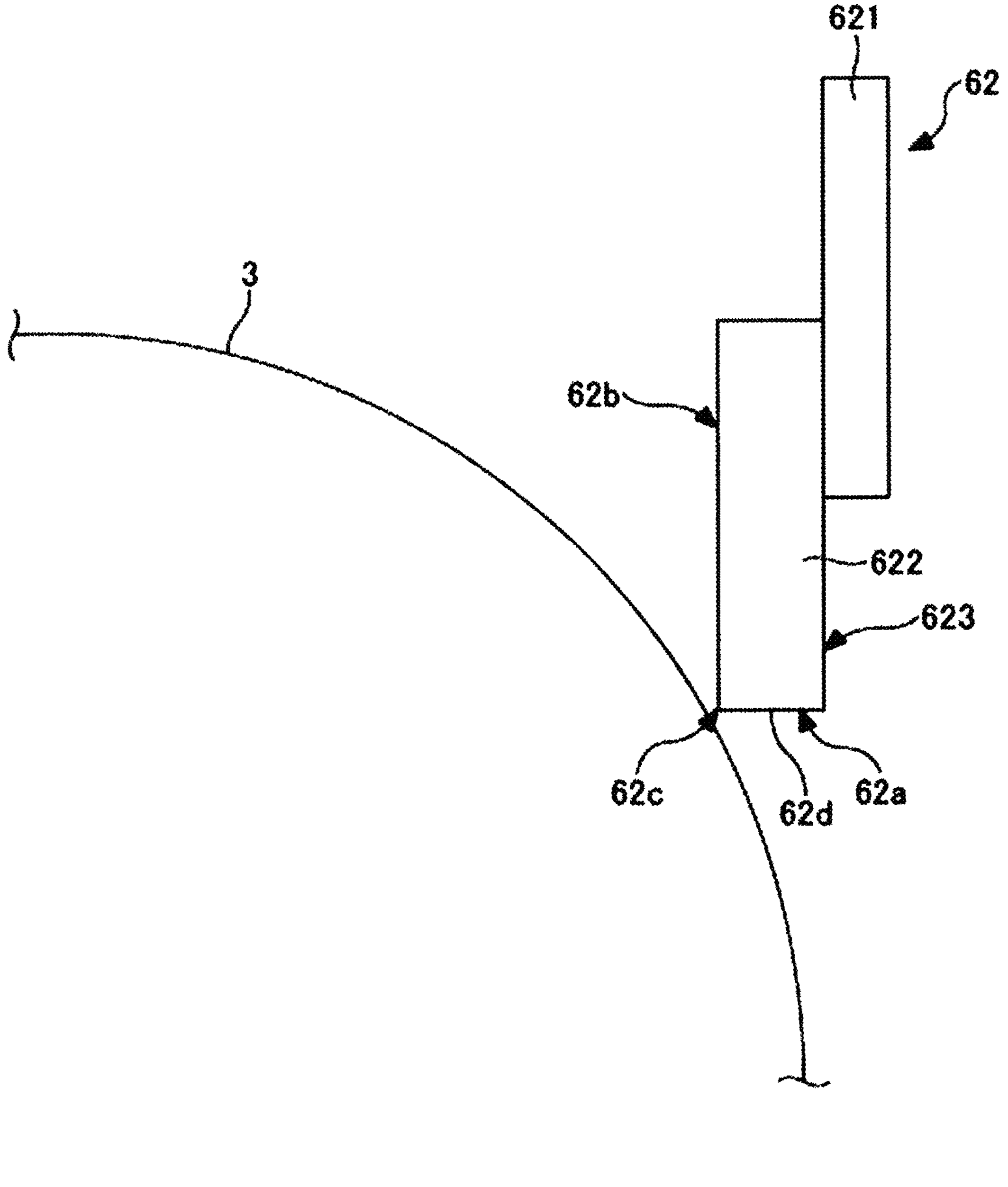
FIG. 1 is a schematic cross-sectional view illustrating an example of the state where the cleaning blade is in contact with the surface of the image bearer.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

For the cleaning blade, in attempts to mitigate the abrasion between the cleaning blade and the image bearer, for example, cleaning blades coated with lubricants containing fluorinated compounds, such as vinylidene fluoride, have been proposed in Unexamined Japanese Patent Application Publication Nos. 2000-147972, 2004-101551, H7-306616 (Japanese Patent No. 3278733), H10-214009, and H6-348193 and used to reduce the abrasion with the image bearer. Furthermore, in an attempt to address the issue of curling or gouging wear at the front edge ridge part of the cleaning blade, a cleaning blade has been proposed in Unexamined Japanese Patent Application Publication No. 2017-016083. This blade includes an elastic member with adequate flexibility and hardness, where the Martens hardness of the surface is set between 1.0 $N/mm^2$ and 15.0 $N/mm^2$, measured at a position 20 μm inward from the front edge ridge part. Additionally, in an attempt to improve the sliding properties of cleaning blades, a cleaning blade coated with a dispersion of PMMA (polymethyl methacrylate) particles in a fluorinated solvent has been proposed in Japanese Patent No. 2853598 (Unexamined Japanese Patent Application Publication No. H8-220962).

According to the present disclosure, an image forming apparatus is provided, which suppresses torque increase even immediately after the start of use of the image forming apparatus and maintains excellent cleaning performance even during continuous printing of high-density images, such as solid images.

The image forming apparatus of the present disclosure includes an image bearer, a charging device to charge a surface of the image bearer, an irradiator to irradiate the surface of the image bearer charged to form a latent electrostatic image, a developing device to develop the latent electrostatic image to form a toner image, a transfer device to transfer the toner image to a recording medium, a fixing device to fix the toner image transferred to the recording medium, and a cleaning device that includes a cleaning blade including an elastic cleaning blade substrate including a front end portion, a front edge ridge part, an undersurface, a coating layer disposed on the front end portion, an edge layer, the coating layer being in contact with the surface of the image bearer to remove residual matter on the surface of the image bearer, and a cleaning blade supporting member to support the elastic cleaning blade substrate, wherein the maximum penetration depth hmax of an indenter of a microhardness tester is between 4.0 μm and 10.0 μm at a position 100 μm inward from the front edge ridge part of the coating layer on the undersurface of the elastic cleaning blade substrate as measured according to a nanoindentation hardness test.

In the following description, an example of the present disclosure is explained with reference to FIG. 3. A cleaning blade 62 includes a cleaning blade supporting member 621 and an elastic cleaning blade substrate 622. The elastic cleaning blade substrate 622 includes an edge layer **622*a* and a base layer 622*b*, which possess elasticity, a contact portion 62*c*, and a coating layer 623 that is provided on at least a part of the contact edge, including the contact edge of the contact portion 62*c***.

Furthermore, the following description explains an embodiment in which the cleaning blade 62 is applied to cleaning the image bearer, which serves as the member to be cleaned (cleaning target).

Additionally, the term "cleaning blade for an image bearer" may simply be referred to as "cleaning blade" in the context of the present disclosure.

Similarly, the "blade substrate of the cleaning blade" may be referred to as the "blade substrate."

Cleaning Blade

An embodiment of the cleaning blade of the present disclosure is to clean an image bearer and the cleaning blade includes an elastic cleaning blade substrate and a cleaning blade supporting member to support the elastic cleaning blade substrate, wherein the elastic cleaning blade substrate includes an edge layer and a coating layer provided on the front end portion that is in contact with the surface of a cleaning target to remove residual matter on the surface, and the maximum penetration depth hmax of an indenter is between 4.0 μm and 10.0 μm at a position 100 μm inside the front edge ridge part of the coating layer at the undersurface of the cleaning blade as measured by a microhardness tester according to nanoindentation hardness test.

The cleaning blade optionally includes other members.

The cleaning blade of the present disclosure removes residual matter adhering to the surface of the image bearer by coming into contact with it.

The residual matter adheres to the surface of the cleaning target. The residual matter is not particularly limited as along as it is to be removed with the cleaning blade. It includes, for example, toner, lubricants, inorganic particles, organic particles, debris, dust, or mixtures thereof.

Cleaning devices equipped with a typical cleaning blade raise concerns about the potential stalling of the image bearer's rotation due to increased torque caused by friction between the cleaning blade and the image bearer. Moreover, this friction leads to wear at the contact point between the cleaning blade and the image bearer, which can cause curling (turning up) of the cleaning blade. This curling allows toner to sneak through, ultimately resulting in cleaning defects.

To improve the sliding properties of the cleaning blade and prevent curling (turning up) or an increase in torque, a process known as "touch-up" is widely used. This process involves applying lubricants, such as metal soaps (e.g., zinc stearate) or PMMA (polymethyl methacrylate) particles, to the front edge of the cleaning blade. Typically, during the operation of an image forming apparatus, toner gradually accumulates between the cleaning blade and the image bearer, acting as a lubricant. As a result, the lubricant is required to exhibit its lubricating properties only for the short period before the cleaning blade's behavior stabilizes after the apparatus begins operating. However, typical lubricants containing fine particles often have weak adhesion to the base material, which causes them to detach from the cleaning blade before its behavior stabilizes.

To minimize the detachment of fine particles from the cleaning blade, there is a known technique involving applying a lubricant that contains fine particles and a binding component to fix the particles at the contact part between the cleaning blade and the image bearer. The binding component reduces the likelihood of particle detachment, effectively preventing an increase in torque. However, the lubricant often remains on the cleaning blade, making it difficult for the blade's front edge (front edge) to be fully exposed. This reduces the pressure at the contact point with the image bearer, worsening cleaning performance. This issue becomes more pronounced when a large amount of toner enters the contact part between the cleaning blade and the image bearer, such as during continuous printing of full solid images.

Through extensive research, the inventors of the present invention have found that if the coating layer containing fine particles and a binding component is made brittle and prone to collapse, the coating layer on the front edge of the cleaning blade can wear away more easily while still reducing torque.

Such a coating layer exposes the blade front edge early, increasing the pressure at the contact part with the image bearer. As a result, cleaning performance can be maintained, achieving both torque reduction and effective cleaning, even in situations where large amounts of toner enter the contact point (e.g., during continuous printing of full solid images).

Accordingly, in the present disclosure, a cleaning blade for cleaning an image bearer is provided and it includes an edge layer and a coating layer.

The coating layer, located on the front end portion of the edge layer in contact with the image bearer, contains fine particles and a binding component. At a position 100 μm inward from the front edge ridge part of the undersurface of the coating layer, the maximum penetration depth hmax of the indenter in nanoindentation hardness testing ranges from 4.0 μm to 10.0 μm. This configuration thus allows torque increases to be suppressed even immediately after the start of use of the image forming apparatus and ensures effective cleaning even in cases where a large amount of toner enters the contact portion, such as during continuous printing of full solid images.

Coating Layer

The coating layer contains fine particles and a binding component that is immiscible with the fine particles and may further optionally include other components. The coating layer is provided on one end of the blade substrate, which serves as the front edge of the cleaning blade on the peripheral side of the blade substrate, as described later. The coating layer may be partially formed on the contact edge where the cleaning blade and image bearer come into contact. It may also be formed over the entire contact edge or the entire surface of the blade substrate. Among these configurations, it is preferable for the coating layer to be formed over the entire contact edge. Additionally, areas of the blade substrate surface where the coating layer is not present may be referred to as "non-coated areas."

The average thickness of the coating layer on the cleaning blade is preferably between 0.5 μm and 10 μm. If the average thickness is at least 0.5 μm, sufficient sliding properties can be achieved. Conversely, if the average thickness is at most 10 μm, the coating layer becomes brittle and prone to collapse, maintaining cleaning performance. The average thickness of the coating layer can be determined by measuring the thickness (in μm) at three or more locations and calculating the average. Measurement locations for the average thickness include the central part of the coating layer, positioned 100 μm inward from the end.

A method of measuring the average thickness of the coating layer involves scraping off a portion of the coating layer using a spatula or cotton swab, followed by shape measurements conducted with a contact surface roughness tester (Surf Test SJ-500, available from Mitutoyo Corporation) or a three-dimensional measuring instrument, such as a laser microscope (LEXT OLS4100, available from Olympus Corporation).

One or more embodiments of the cleaning blade described in the present disclosure are illustrated with reference to the accompanying drawings. The application of the cleaning blade described in the present disclosure is not limited to these embodiments. In the drawings, identical components may be denoted by the same reference numerals (or symbols), and redundant descriptions may be omitted. Additionally, the present disclosure is not restricted to the specific numbers, positions, or shapes of the configurations described below. These parameters may be appropriately selected to suit the implementation of the present disclosure.

Figure 2:
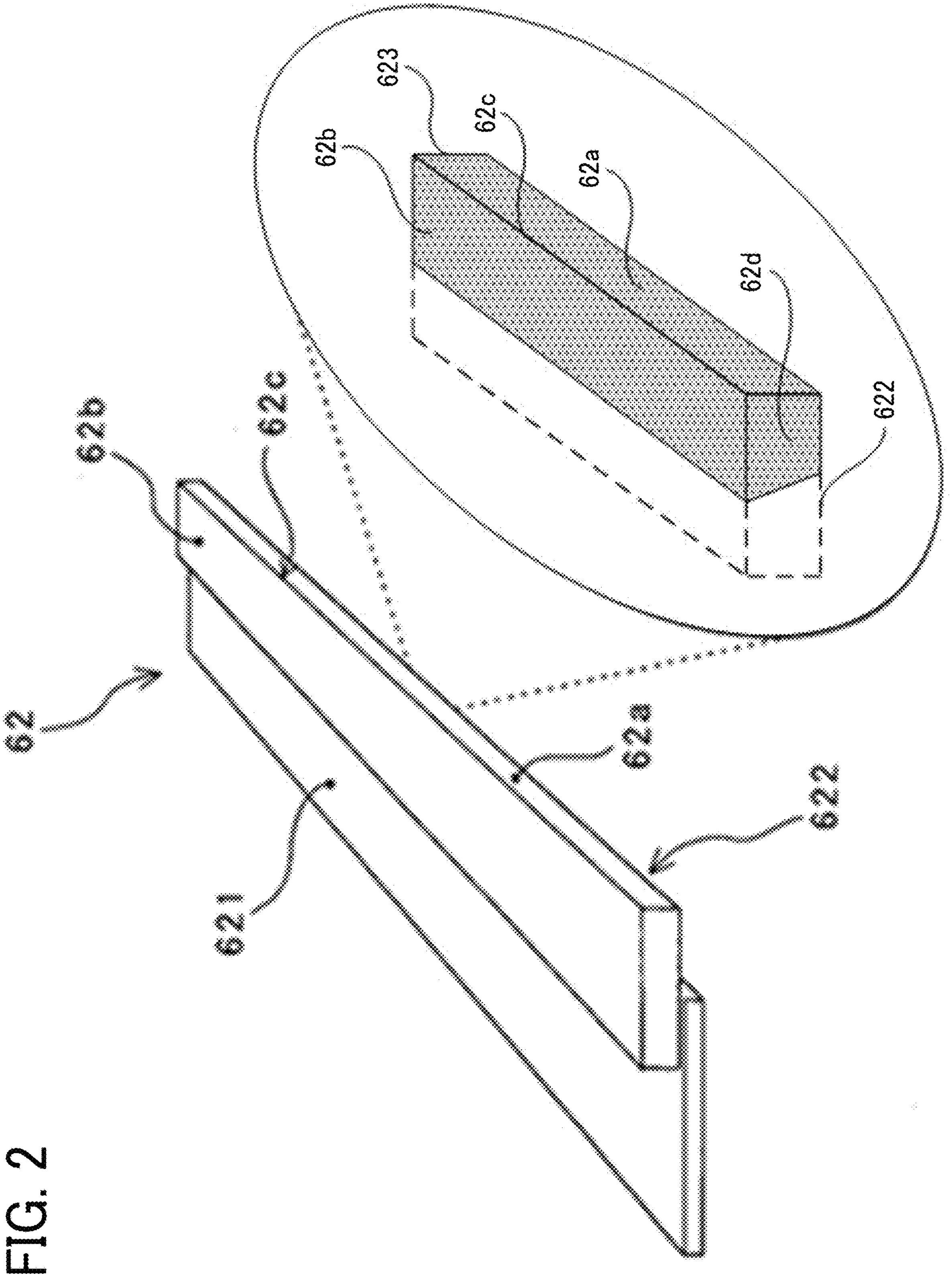
FIG. 2 is a perspective view illustrating an example of the cleaning blade for an image bearer according to the present disclosure.

FIG. 1 is a schematic cross-sectional diagram illustrating an embodiment of the cleaning blade of the present disclosure, illustrating the state in which the cleaning blade is in contact with the surface of the image bearer. FIG. 2 is a diagram illustrating a perspective view and an enlarged view of the vicinity of the contact portion of the cleaning blade illustrated in FIG. 1. The cleaning blade 62 includes a flat cleaning blade supporting member 621 made of a rigid material such as metal or hard plastic and a flat cleaning blade substrate 622. One end of the elastic cleaning blade substrate 622 is connected to the cleaning blade supporting member 621, while the other end forms a free end of predetermined length. The elastic cleaning blade substrate 622 is fixed to one end of the cleaning blade supporting member 621 using an adhesive or similar additives, and the other end of the cleaning blade supporting member 621 is cantilevered to the housing of the cleaning device. The elastic cleaning blade substrate 622 includes a cleaning blade front edge surface 62*a*, a cleaning blade undersurface 62*b*, a contact portion 62*c* of the cleaning blade, which forms one end on the side of the free end of the elastic cleaning blade substrate 622, and a cleaning blade side surface 62*d*. The clastic cleaning blade substrate 622 includes the coating layer 623 formed on at least part of the contact portion 62*c* of the cleaning blade including its contact edge. A coating layer 623 is formed on at least part of the contact portion 62*c* of the cleaning blade, including its contact edge. The cleaning blade 62 is positioned such that the contact portion 62*c* of the cleaning blade runs along its longitudinal direction and remains in contact with the surface of the image bearer 3.

Figure 3:
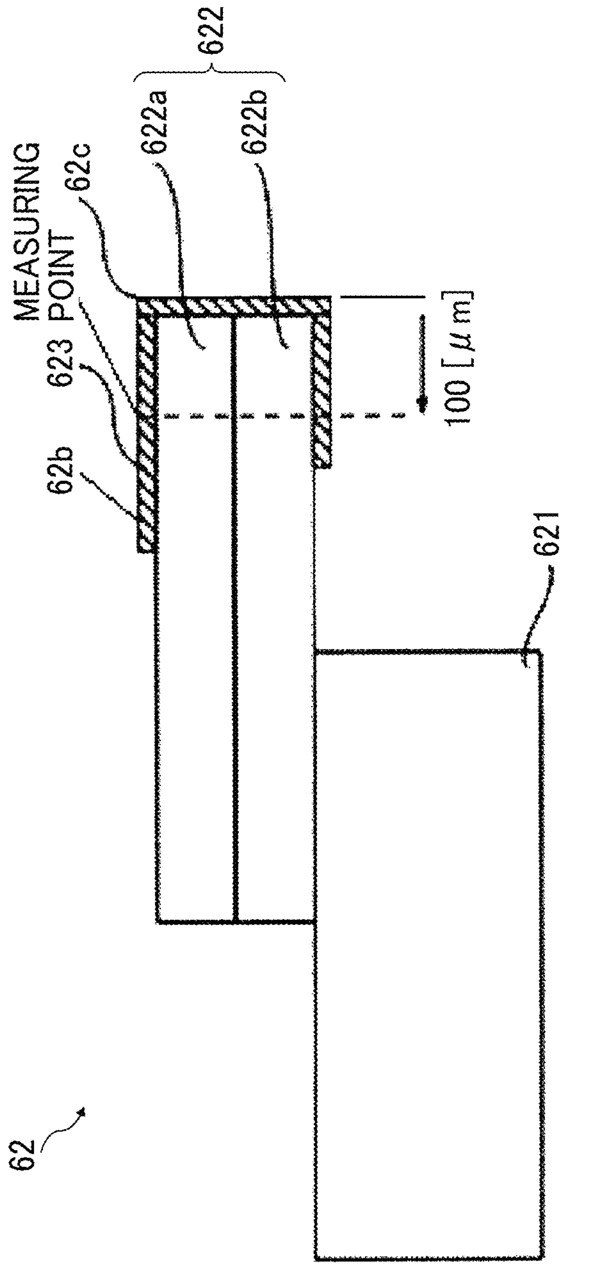
FIG. 3 is a diagram illustrating another example of the cleaning blade for an image bearer of the present disclosure.

FIG. 3 is a schematic cross-sectional view illustrating another embodiment of the cleaning blade of the present disclosure. The cleaning blade 62 includes the cleaning blade supporting member 621 and the elastic cleaning blade substrate 622. The elastic cleaning blade substrate 622 includes an edge layer 622*a* with elasticity, a base layer 622*b*, a contact portion 62*c*, and the coating layer 623 formed on at least part of the contact portion 62*c* including its contact edge. The cleaning blade front edge surface 62*a*, cleaning blade undersurface 62*b*, and cleaning blade side surface 62*d* are omitted in FIG. 3.

The coating layer in the present disclosure contains particles and a resin binding component. In one aspect of the present disclosure, it is preferred that the particles serve as domains in the sea-island structure of the coating layer. The type and amount of the particles can be selected according to the type of resin binding component to form the domains.

There are no particular restrictions on the shape of the particles, and it can be suitably selected to suit to a particular application, whether it is regular or irregular. Of these, regular shapes are preferable. If the domain has a regular shape, it is preferably spherical. Such a shaped domain is suitable for preventing issues such as damage to an intermediate transfer body or the blade substrate of the cleaning blade caused by the particles detached from the coating layer.

The volume average particle diameter (50 percent volume diameter, median diameter) of the particles is not particularly limited and can be selected appropriately for the intended purpose. It is preferably between 0.1 μm and 1 μm, more preferably between 0.1 μm and 0.5 μm, and even more preferably between 0.1 μm and 0.3 μm. A volume average particle diameter of the particles of at most 1 μm prevents issues such as unstable dispersion caused by sedimentation of the particles in a solvent. Moreover, a volume a particle diameter of at most 0.5 μm stably disperses the particles in non-aqueous solvents.

There are no specific restrictions on the method of measuring the volume average particle diameter (50 percent volume diameter, median diameter), and it can be suitably selected to suit to a particular application. For example, it can be measured using techniques such as laser diffraction/scattering, dynamic light scattering, or image imaging. Specific methods include a method of applying particles collected from the coating layer of a cleaning blade to a microtrack (available from NIKKISO CO., LTD.) for measurement using laser diffraction/scattering, and a method of directly measuring fine particles on the cleaning blade by counting them with a scanning electron microscope (SEM). It should be noted that the volume average particle diameter of the particles does not significantly change between the particles added to a liquid dispersion to be applied to a cleaning blade and those present in the coating layer.

The content of the particles in the coating layer is not particularly limited and can be selected according to the purpose. To achieve a sliding effect while ensuring that the coating layer becomes brittle and allows easy detachment of the particles due to their higher relative content compared to the binding component, the particle content is preferably between 80 percent by mass and 99 percent by mass of the total mass of the coating layer, more preferably between 90 percent by mass and 98 percent by mass.

Materials for the particles are not specifically restricted and it can be selected according to the purpose.

Specific examples involve, but are not limited to, polytetrafluoroethylene (PTFE), tetrafluoroethylene-perfluoropropylene copolymer (FEP), perfluoroalkoxy polymer (PFA), chlorotrifluoroethylene copolymer (CTFE), tetrafluoroethylene-chlorotrifluoroethylene copolymer (TFE/CTFE), ethylene-chlorotrifluoroethylene copolymer (ECTFE), and polychlorotrifluoroethylene (PCTFE). Of these, polytetrafluoroethylene (PTFE) is preferable to enhance the slidability of the cleaning blade.

Polytetrafluoroethylene (PTFE) can be synthesized as needed or procured.

Specific examples of products of PTFE include, but are not limited to, the following brand names: Dion TF Micro Powder TF-9201Z and Dion TF Micro Powder TF-9207Z (both available from 3M Company), Nano FLON 119N and FLUORO E (both available from Shamrock Technologies), TLP10F-1 (available from Mitsui DuPont Fluorochemicals), KTL-500F (available from KITAMURA LIMITED), and Algoflon L203F (available from Solvay S.A.).

In the present disclosure, inclusion of a binding component in the coating layer enhances the adhesion of the particles to the elastic cleaning blade substrate, thereby preventing the detachment of the coating layer. Consequently, it is possible to prevent turning-up and an increase in torque of the cleaning blade. In one aspect of the present disclosure, it is preferable that the binding component serve as the matrix in the sea island structure of the coating layer. In combination with the binding component, the type and amount of the resin should preferably be selected to act as the matrix in the sea island structure.

The binding component is not particularly restricted, and it can be suitably selected to suit to a particular application, provided that it allows for the uniform and stable dispersion of the particles. It includes, for example, vinylidene fluoride (VdF), hexafluoropropylene (HFP), and tetrafluoroethylene (TFE).

Among these, copolymers combining these components are preferable and a VdF-HFP-TFE terpolymer is more preferable in terms of lubricity and adhesion to the blade substrate.

Each component in the terpolymer composition of VdF/HFP/TFE is preferably present in the following molar percentages: 30 to 80 mol percent for VdF, 10 to 35 mol percent for HFP, and 5 to 35 mol percent for TFE, to impart flexibility to the blade and the solubility of the binding component in a solvent.

The particles and the binding component are not limited to the examples mentioned above and can be appropriately selected according to the purpose. Examples include, but are not limited to, fine particles of inorganic compounds, acrylic resins, styrene-based resins, and vinyl-based resins.

Specific examples of the inorganic compound fine particles include, but are not limited to, silica, alumina, and zirconia. These can be used alone or in combination.

The coating layer is particularly preferable when it is formed of a combination of PTFE particles and fluroresin or a combination of acrylic particles and polyvinyl alcohol resin or polyvinylacetal resin.

As particles other than the fluororesin, acrylic resins are preferable because they have a certain degree of hardness, thereby providing an expected effect on sliding properties. On the other hand, there are no particular limitations on the shape, and it can be appropriately selected according to the purpose. It is preferably a spherical shape. Such a shape is suitable because it prevents issues including damage to an image bearer and the blade substrate of the cleaning blade caused by detachment of particles other than the fluororesin from the coating layer.

The volume average particle diameter (50 percent volume diameter, median diameter) of the particles other than the fluororesin is not particularly limited and can be selected appropriately for the intended purpose. It is preferably between 0.1 μm and 1 μm, more preferably at most 0.5 μm, and even more preferably at most 0.3 μm. A volume average particle diameter of the particles of at most 1 μm prevents issues such as unstable dispersion caused by sedimentation of the particles in a solvent. Moreover, a volume a particle diameter of at most 0.5 μm stably disperses the particles in non-aqueous solvents.

There are no particular limitations on the method of producing the coating layer, and it can be appropriately selected according to the purpose. For example, it can be obtained by admixing particles with a mixture of a solvent and a binding component to prepare a particle dispersion and applying the dispersion to the blade substrate of the cleaning blade.

There are no particular limitations on the solvent, and it can be appropriately selected according to the purpose. For example, in the case of fluorine-based particles and binding components, fluorine-containing organic solvents can be used. Examples of fluorine-containing organic solvents include, but are not limited to, hydrofluoroethers (HFE), perfluorocarbons (PFC), and perfluoroethers (PFE). These can be used alone or in combination.

In the present disclosure, the average particle diameter of the particles in the binding component, measured by dynamic light scattering (cumulant analysis based on the intensity distribution), is preferably at most 1 μm, more preferably at most 0.5 μm, and even more preferably at most 0.3 μm, to achieve a uniform dispersion. Even if fine particles with a volume-average particle diameter of at most 1 μm are used, the particles are likely to aggregate to form secondary particles, resulting in a volume-average particle diameter of at least 1 μm. By dispersing these aggregated secondary particles to achieve a particle diameter of at most 1 μm, it is possible to obtain a stable dispersion even if the fluororesin dispersion is stored long-term at low viscosity. There are no particular limitations on the dispersion method, and it can be appropriately selected according to the purpose. Specific examples include, but are not limited to, methods using dispersing machines such as ultrasonic dispersers, three-roll mills, ball mills, bead mills, and jet mills.

There are no particular limitations on the method of forming the coating layer, and it can be appropriately selected according to the purpose. One such example method is dipping, where the blade substrate is either fully or partially immersed in a particle dispersion. In addition to dipping, other coating methods such as spray coating or using a dispenser can also be used.

Blade Substrate

In the present disclosure, the blade substrate of the cleaning blade may also be referred to as the "blade substrate" or "substrate." The shape of the blade substrate should be such that it can remove the residual matter on the image bearer, and it can be appropriately selected according to the purpose. It is preferable for the contact edge at the contact portion between the blade substrate and the image bearer to be linear. An example of the blade substrate shape is a plate-like structure.

As for the structure of the blade substrate, there are no specific limitations, and it can be appropriately selected according to the purpose. Examples include single-layer structures, laminated structures, and laminated structures combining multiple members. Of these, single-layer structures and laminated structures combining multiple members are preferable because they are easier to process in forming the cleaning blade. If the blade substrate has a layered (laminate) structure, the layer in contact with the image bearer may be referred to as the edge layer, and the layer other than the edge layer may be referred to as the base layer. If the blade substrate is a single layer, the blade substrate consists only of the edge layer. It is more preferable that the Martens hardness of the multiple materials in the layered structure differ from one another.

The material of the blade substrate is not particularly limited and can be appropriately selected according to the purpose. In terms of wear prevention of the blade substrate and the removal of residual matter on the image bearer, it is preferable for the blade substrate to have appropriate elasticity and hardness. Examples of materials for the blade include clastic materials. As for the clastic material, as long as it has high elasticity, there are no particular limitations, and it can be appropriately selected depending on the purpose. Examples include, but are not limited to, polyurethane rubber, silicone rubber, fluororubber, nitrile rubber (NBR), and ethylene-propylene-diene rubber (EPDM).

Of these, polyurethane rubber is preferable in terms of durability and non-contamination. The blade substrate may take any size and be suitably selected to suit to the size of the image bearer.

The Martens hardness of the polyurethane rubber in the cleaning blade of the present disclosure is not particularly limited and can be appropriately selected according to the purpose. It is preferably in the range of 0.5 $N/mm^2$ to 2 $N/mm^2$. Ensuring that the Martens hardness of the polyurethane rubber in the cleaning blade falls within the desired range can resolve issues such as cleaning defects caused by difficulty in achieving a desired blade line pressure or by an increased contact area with the image bearer, as well as problems such as chipping resulting from the blade substrate becoming excessively stiff.

The method of manufacturing the blade substrate is not particularly limited and can be suitably selected according to the specific application. One such method involves preparing a polyurethane prepolymer by reacting a polyol compound with a polyisocyanate compound, adding a curing agent and optionally a curing catalyst to the prepolymer, centrifugally molding the resulting mixture in a specified mold, allowing it to age at room temperature, and finally cutting the cured material into flat plates of predetermined dimensions.

The polyol compound is not particularly limited and can be suitably selected to suit to a particular application. They include low molecular weight polyols and high molecular weight polyols.

Specific examples of the polyol having a large molecular weight include, but are not limited to, polyester polyol, i.e., a condensation of an alkylene glycol and a aliphatic dibasic acid such as polyester-based polyols such as polyester polyols of alkylene glycol and adipic acid such as ethlylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone based polyols such as polycaprolactone ester polyols obtained by ring-opening polymerization of caprolactone; and polyether-based polyols such as poly (oxytetramethylene) glycol, and poly (oxypropylene) glycol. These can be used alone or in combination.

Specific examples of the polyol having a low molecular weight include, but are not limited to, diols such as 1,4-butane diol, ethylene glycol, neopentyl glycol, hydroxynone-bis (2-hydroxyethyl) ether, 3,3'-dichloro-4,4'-diamino diphenyl methane, 4,4'-diaminodiphenyl methane, and tri- or higher alcohols such as 1,1,-trimethylol propane, glycerine, 1,2,6-hexane triol, 1,2,4-butane triol, tirmethylol ethane, 1,1,1-tris(hydroxyethyoxymethyl) propane, diglycerine, and pentaerythritol. These can be used alone or in combination.

The polyisocyanate compound is not specifically limited and can be chosen appropriately according to the purpose.

Specific examples include, but are not limited to, methylene diphenyl diisocyanate (MDI), toluene diisocyanate (TDI), xylene diisocyanate (XDI), naphthalene-1,5-diisocyanate (NDI), tetramethylxylylene diisocyanate (TMXDI), isophorone diisocyanate (IPDI), hydrogenated xylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI). These can be used alone or in combination.

The curing agent is not particularly limited and can be suitably selected to suit to a particular application. It includes amines and alcohols. These can be used alone or in combination. The curing agent can act to adjust the hardness of the blade substrate.

The curing catalyst is not particularly limited and can be suitably selected to suit to a particular application. It includes 2-methylimidazole and 1,2-dimethyl imidazole. The proportion of the curing catalyst is not particularly limited and can be suitably selected to suit to a particular application. It is preferably from 0.01 to 0.5 percent by mass and more preferably from 0.05 to 0.3 percent by mass to the entire mass of the prepolymer and the curing agent.

The rebound resilience of the elastic member (elastic cleaning blade substrate), measured in compliance with JIS K6255 (Rubber, vulcanized or thermoplastic—Determination of rebound resilience), is not particularly limited and can be suitably selected according to the specific application. Preferably, it is between 10 percent and 80 percent at 23 degrees Celsius. If the rebound resilience is within this desired range, issues such as cleaning defects caused by insufficient flexibility of the blade substrate—resulting in its inability to adapt to the oscillation and roughness of the image bearer—can be eliminated. Additionally, excessive rebound, which can cause blade creaking (abnormal noise), is also prevented. The rebound resilience coefficient of the blade substrate can be measured, for instance, using a No. 221 resilience tester (available from Toyo Seiki Seisaku-sho, Ltd.) in accordance with JIS K6255 mentioned above at 23 degrees Celsius.

Maximum Indentation Depth Hmax of the Indenter

For the cleaning blade described in the present disclosure, the maximum indentation depth hmax of the indenter at a position 100 μm inward from the front edge ridge part of the edge layer is preferably between 4.0 μm and 10.0 μm. This range ensures that the coating layer becomes sufficiently brittle and prone to collapse. The hmax value at the position 100 μm inward from the front edge ridge part of the edge layer in the cleaning blade is preferably between 5.5 μm and 7.5 μm, achieving a balance between sliding performance and cleaning efficiency through the collapsibility of the coating layer. If the hmax at this position is at least 4.0 μm, the coating layer becomes prone to collapse, so that cleaning performance can be maintained even during continuous high-density image printing. If the hmax is less than 4.0 μm, the coating layer resists collapsing, resulting in an inability to maintain the cleaning performance during continuous high-density image printing. On the other hand, if the hmax exceeds 10.0 μm, the coating layer collapses too easily, leading to issues such as impaired sliding performance or unintended detachment of the coating layer from the cleaning blade, even when not in operation. In the present disclosure, Martens hardness is measured on a product processed to function as a cleaning blade.

Measurement of Maximum Indentation Depth Hmax

The maximum indentation depth hmax of the indenter is measured in accordance with ISO 14577 using a nanoindenter (ENT-3100, available from ELIONIX INC.) equipped with a Berkovich indenter. The measurement involves pressing the indenter under a load of 1,000 μN over 10 seconds, holding the load for 5 seconds, and then releasing the load over 10 seconds at the same loading rate. The hmax value is calculated from the load-displacement curve. In the present disclosure, the hmax is defined as the depth of the indenter after the 5-second holding period. The measurement location on the edge layer is set at a position 100 μm inward from the front edge ridge (contact portion) 62*c* of the edge layer, as illustrated in FIG. 3. The loading rate increases at a constant speed from 0 μN to 1,000 μN over 10 seconds.

Measurement of Martens Hardness

There are no specific restrictions on the measurement location for the Martens hardness in the base layer of the cleaning blade. However, for ease of measurement, a position 100 μm inward from the side end of the base layer is used. The Martens hardness value is determined as the median of measurements taken at 4 to 6 points at the specified location. The measurement conditions are the same as those described in Measurement of Maximum Indentation Depth hmax measurement.

Process Cartridge

The process cartridge according to one embodiment of the present disclosure includes an image bearer, a cleaning device that is brought into contact with the surface of the image bearer to remove residual matter on the surface of the image bearer, the cleaning device including the cleaning blade mentioned above, and at least one of a charging device to charge a surface of the image bearer, an irradiator to irradiate the surface of the image bearer charged to form a latent electrostatic image, a developing device to develop the latent electrostatic image to form a toner image, and a transfer device to transfer the toner image to a recording medium. The process cartridge is detachably attached to the main body of the image forming apparatus and may optionally include other components.

Image Forming Apparatus and Image Forming Method

The image forming apparatus includes an image bearer, a charging device to charge the surface of the image bearer, an irradiator to irradiate the surface of the image bearer charged to form a latent electrostatic image, a developing device to develop the latent electrostatic image with toner to form a visible image, a transfer device to transfer the visible image to a recording medium via an intermediate transfer body, a fixing device to fix the image transferred to the recording medium, a cleaning device to remove residual matter on the intermediate transfer body, and other optional devices. A combination of the charging device and the irradiator is also referred to as a latent electrostatic image forming device. The cleaning device has the cleaning blade of the present disclosure.

The image forming method related to the present disclosure includes a charging process, an irradiation process, a development process, a transfer process, a cleaning process, a protection layer formation process, a fixing process, and other optional processes. A combination of the charging process and the irradiation process are also referred to as a latent electrostatic image formation process.

The image formation method of the present disclosure is suitably performed by the image forming apparatus of the present disclosure. The charging process is performed by the charging device. The irradiation process is performed by the irradiation device. The development process is performed by the development device. The transfer process is performed by the transfer device. The cleaning process is performed by the cleaning device. The cleaning device includes the charging blade of the present disclosure. In addition, the other processes are suitably conducted by the other corresponding devices.

Image Bearer

The size and structure of the image bearer is not particularly limited, and it can be suitably selected among the devices known in the art to suit to a particular application. The shape of the image bearer is not particularly limited and can be suitably selected to suit to a particular application. For example, it can take a drum-like shape and a belt-like shape. There is not specific limitation on the materials of the image bearer, and it can be suitably selected to suit to a particular application. Specific examples include, but are not limited to, inorganic compounds such as amorphous silicon and selenium for an inorganic photoconductor and organic compounds such as polysilane and phthalopolymethine for an organic photoconductor (OPC).

An example of the organic photoconductor is a layered photoconductor, including layers—a charge-generation layer formed of non-metallic materials like phthalocyanines or titanyl phthalocyanines dispersed in a binder resin and a charge-transport layer formed of charge transport materials dispersed in a binder resin—stacked on a substrate such as an aluminum drum.

Another type is a single-layer photoconductor with a single-layer structure on a substrate, featuring a photosensitive layer formed of both charge-generation and charge-transport materials dispersed in a binder resin.

In the single-layer photoconductor, hole transport agents and electron transport agents can be added to the photosensitive layer as charge transport materials.

Additionally, an undercoat layer may be provided between the substrate and either the charge generation layer of a multi-layer photoconductor or the photosensitive layer of a single-layer photoconductor.

Charging Process and Charging Device

The charging process involves charging the surface of an image bearer, which is carried out by the charging device. The charging device is not particularly limited and can be suitably selected to suit to a particular application as long as it is capable of charging the surface of the image bearer.

Specific examples include, but are not limited to, a known contact type charger that includes an electroconductive or semiconductive roller, brush, film, or a rubber blade, and a non-contact type charger using corona discharging such as corotron and scorotron.

The shape of the charging device may vary. For example, it can take the form of rollers, magnetic brushes, and fur brushes, and can be selected according to the specifications and configuration of an electrophotographic image forming apparatus. If a magnetic brush is used, the magnetic brush is formed of a charging member made of, for example, ferrite particles such as Zn—Cu ferrite, a non-magnetic electroconductive sleeve to support the charging member, and a magnet roll disposed inside the electroconductive sleeve.

If a fur brush is used, fur electroconductively-treated by carbon, copper sulfide, metal, or metal oxide is used as fur brush material, which is rolled round or attached to metal or electroconductively treated core metal to obtain the charging member.

The charger is not limited to the contact type charger described above, but using such a contact type charger is preferable to obtain an image forming apparatus with such a charger producing a less amount of ozone. It is preferable to apply a direct voltage or a voltage obtained by superimposing an alternating voltage to a direct voltage to the surface of the image bearer by the charger arranged in contact with or in the vicinity of the latent image bearer. The charging device is preferably a charging roller disposed in contact with the image bearer with a gap tape therebetween. It is preferable that the charging roller apply a direct voltage on which an alternate voltage is superimposed to charge the surface of the image bearer.

Irradiation Process and Irradiation Device

The irradiation (exposing) process involves irradiating the surface of a charged image bearer with beams of light, and is carried out by the irradiator. Irradiation is conducted by irradiating the surface of the latent image bearer according to data information using the irradiation device. In exposure (irradiation), the optical system can be broadly classified into analog optical systems and digital optical systems. The analog optical system directly projects the original document onto the surface of an image bearer. The digital optical system receives image information as electrical signals, converts the electrical signals into optical signals, and exposes and forms images on an image bearer.

As for the exposure device, as long as it is capable of exposing the charged image bearer to form a latent electrostatic image, there is no particular limitation, and various exposure devices such as a copying optical system, a rod lens array system, a laser optical system, a liquid crystal shutter optical system, and an LED optical system can be selected to suit to a particular application. Embodiments of the present disclosure can employ a dorsal irradiation system, where the latent image bearer is irradiated from the rear side in an imagewise manner.

Developing Process and Developing Device

The developing process involves developing a latent electrostatic image into a toner image, and is carried out by the developing device. The developing device is not particularly limited and can be suitably selected to suit to a particular application as long as it is capable of developing a latent electrostatic image into a toner image. Various options can be selected depending on the purpose. They include a developing device that houses toner and is capable of applying the toner to the electrostatic latent image either in contact or non-contact manner. The developing device may be of dry or wet development type, and may be monochrome or multi-color. For example, it may include a mixer for triboelectrically charging the toner, and a rotatable magnetic roller. Within the developing device, the toner and carrier are mixed and stirred as needed, resulting in the toner becoming charged due to friction. The charged toner is held in a filament-like state on the surface of the rotating magnetic roller, forming a magnetic brush. The magnetic roller is positioned near the image bearer, so some of the toner forming the magnetic brush on the surface of the magnetic roller is moved to the surface of the image bearer by the electrostatic attraction force of the latent electrostatic image. As a result, the latent electrostatic image is developed into a toner image on the surface of the image bearer. The toner housed in the developing device may be a developing agent containing the toner mentioned above, which can be a single-component or two-component developing agent. Additionally, the toner can be used as a single-component magnetic toner without using a carrier, or as a non-magnetic toner.

As a development method, a premix development system, in which a premixed developing agent containing toner and carrier mixed in advance is supplied, may be adopted. In the premix development system, the excess developing agent, corresponding to the increase in carrier within the developing unit, is ejected as surplus developing agent. This system gradually refreshes the developing agent within the developing unit. Thus, it is possible to extend the replacement cycle associated with developing agent deterioration and reduce the effort required for developing agent replacement.

Transfer Process and Transfer Device

The transfer process involves transferring the toner image onto a recording medium, and is carried out by the transfer device. The transfer process preferably includes a primary transfer process, in which the toner image is transferred onto the surface of an intermediate transfer member to form a composite transfer image, and a secondary transfer process, in which the composite transfer image is transferred onto the recording medium. As for the transfer device, there is no particular limitation as long as it is capable of transferring the toner image onto the recording medium. Depending on the purpose, it is preferable to have a transfer device including a primary transfer device for transferring the toner image onto the surface of the intermediate transfer member to form a composite transfer image, and a secondary transfer device for transferring the composite transfer image onto the recording medium. The transfer device (the primary transfer device and the secondary transfer device) preferably has at least a transfer unit that peels off and charges the toner image formed on the surface of the image bearer onto the recording medium. The transferring device is not particularly limited and can be suitably selected to suit to a particular application. It includes a corona transferring device using corona discharge, a transfer belt, a transfer roller, a pressure transfer roller, and an adhesive transferring device. One or more transfer devices can be provided.

A typical example of the recording paper is plain paper but any paper to which a non-fixed image after development can be transferred can be used. PET base for an overhead projector can be also used.

Fixing Process and Fixing Device

The fixing process involves fixing the toner image transferred onto the recording medium, and is carried out by the fixing device. If using two or more colors of toner, each color of toner may be fixed each time it is transferred onto the recording medium, or all colors of toner may be fixed after being transferred and stacked on the recording medium. The fixing device is not particularly limited and can be suitably selected to suit to a particular application as long as it is capable of fixing the toner image transferred onto the recording medium. The thermal fixing method using a known heating and pressure device can be employed. The heating and pressure device is not particularly limited and can be suitably selected to suit to a particular application. For example, combinations of heating rollers and pressure rollers, or combinations of heating rollers, pressure rollers, and endless belts can be used. The heating temperature can be selected appropriately depending on the purpose and, preferably, ranges from 80 to 200 degrees C. Depending on particular applications, for example, a known optical fixing device can be used together with the fixing device.

Cleaning Process and Cleaning Device

One of the cleaning blades of the present disclosure is described with reference to drawings. In each drawing, the same components may be denoted by the same reference numerals (symbols) and redundant description may be omitted. Additionally, the present disclosure is not restricted to the specific numbers, positions, or shapes of the configurations described below. These parameters may be appropriately selected to suit the implementation of the present disclosure.

The line pressure applied by the cleaning substrate of the cleaning blade of the present disclosure onto the surface of the image bearer can be selected as appropriate depending on the purpose, with no specific limitations. It preferably ranges from 10 to 100 N/m and more preferably from 10 to 50 N/m. A linear pressure between 10 N/m and 100 N/m reduces the likelihood of cleaning defects, such as toner slipping through the contact portion and the image bearer. At the same time, it also helps to suppress the flipping of the elastic member. The line pressure can be measured, for example, using a measurement device incorporating a small compression-type load cell available from Kyowa Electronic Instruments Co., Ltd.

The angle formed between the tangent of the image bearer at the position where the contact portion of the cleaning substrate of the cleaning blade is brought into contact and the front surface of the free end of the blade substrate in the cleaning blade is not particularly limited and can be suitably selected to suit to a particular application. It is preferably between 65 degrees and 85 degrees. This angle is referred to as the "cleaning angle" hereinafter. The cleaning angle between 65 degrees and 85 degrees is preferable to reduce the occurrence of blade turning-up and consequently minimize the occurrence of cleaning defects.

Other Processes and Other Devices

The other processes may include, for example, a quenching process, a recycling process, and a control process. The other devices include, for example, a quencher, a recycling device, and a control device.

Discharging (Quenching) Process and Discharging (Quenching) Device

The quenching process applies a quenching bias to an image bearer using a quencher. The quencher is not particularly limited as long as it can apply a quenching bias to a latent electrostatic image bearer. It is not particularly limited and can be suitably selected to suit to a particular application, including a quenching (discharging) lamp.

Recycling Process and Recycling Device

In the recycling process, the toner removed in the cleaning process mentioned above is returned to the developing device for re-use. This recycling process is suitably conducted by a recycling device. The recycling device is not particularly limited and can be suitably selected among conveyors known in the art to suit to a particular application.

Control Process and Control Device

The control process mentioned above is to control each process and can be suitably conducted by the control device. The control device is not particularly limited and can be suitably selected to suit to a particular application. Any control device able to control the behavior of each device can be used. For example, devices such as a sequencer and a computer can be listed.

An example of the image forming apparatus of the present disclosure is described with reference to the drawings.

Figure 4:
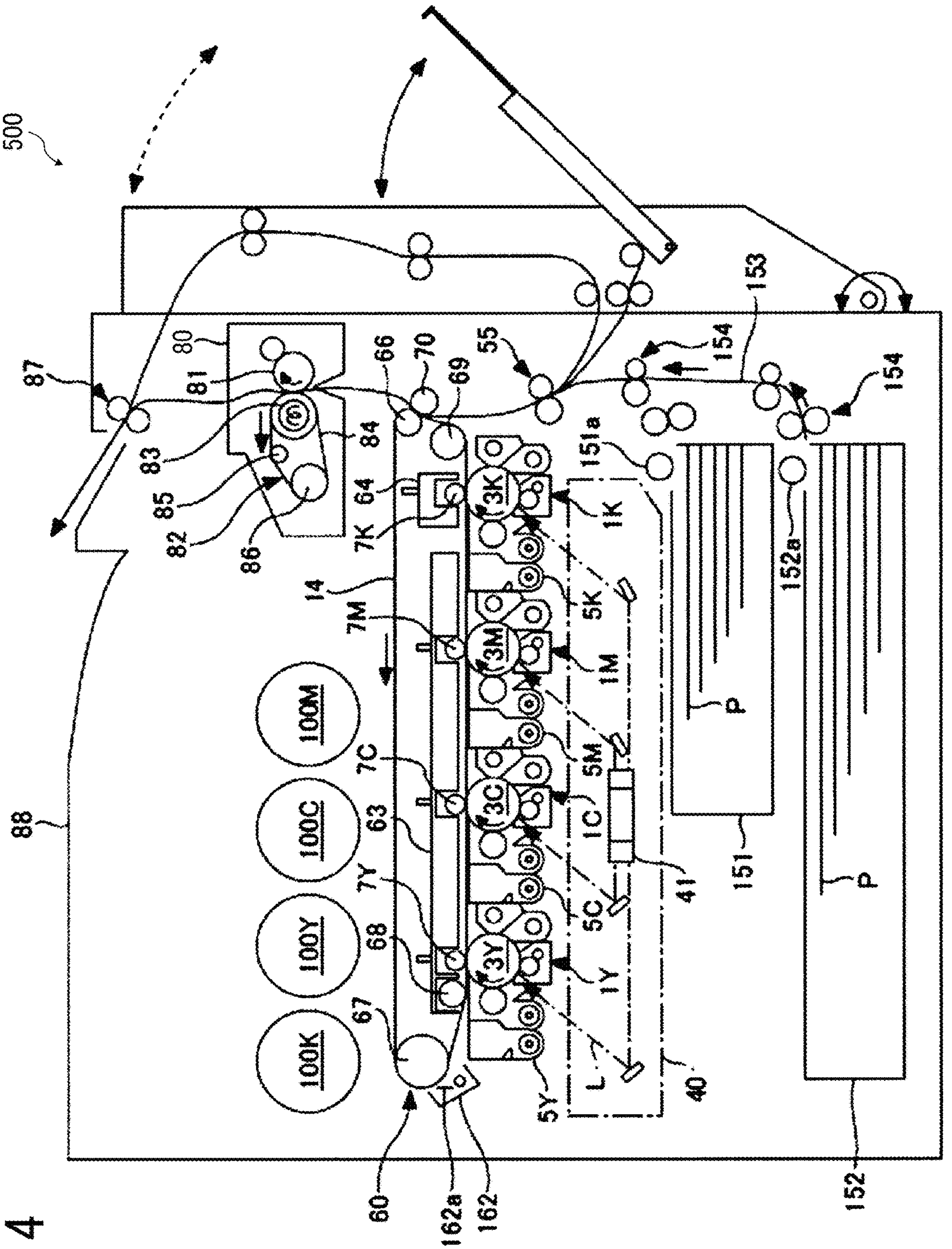
FIG. 4 is a schematic diagram illustrating an a cross-sectional view of an example of the image forming apparatus of the present disclosure.

FIG. 4 is a schematic diagram illustrating an embodiment of the image forming apparatus of the present disclosure.

An image forming apparatus 500 illustrated in FIG. 4 includes four image forming units, 1Y, 1C, 1M, and 1K, for yellow, magenta, cyan, and black (hereinafter referred to as Y, C, M, and K). These units use toners of different colors, Y, C, M, K, as image forming substances to form images, but otherwise have similar configurations.

Above each of the four imaging units 1Y, 1C, 1M, and 1K, a transfer unit 60 equipped with an intermediate transfer belt 14 as an intermediate transfer medium is arranged. The toner images of each color formed on the surfaces of the image bearers 3Y, 3C, 3M, and 3K provided in each of the image forming units 1Y, 1C, 1M, and 1K detailed later are transferred in a superimposed manner onto the surface of the intermediate transfer belt 14.

Below each of the four imaging units 1Y, 1C, 1M, and 1K, an optical writing unit 40 is arranged. The optical writing unit 40, as a latent image forming device, emits a laser light L based on image information onto each image bearer 3Y, 3C, 3M, and 3K of each imaging unit 1Y, 1C, 1M, and 1K. Consequently, latent electrostatic images for Y, C, M, and K are formed on each image bearer 3Y, 3C, 3M. The optical writing unit 40 deflects laser light L emitted from a light source by a polygon mirror 41 rotated by a motor, and irradiates each image bearer 3Y, 3C, 3M through multiple optical lenses and mirrors. Alternatively, an optical scanning using an LED array can be adopted instead of this configuration.

Below the optical writing unit 40, a first paper cassette 151 and a second paper cassette 152 are arranged to overlap in the vertical direction. These paper cassettes contain a bundle of recording media P stacked therein, with the top recording medium P in each cassette being brought into contact with a first paper feed roller 151*a* and a second paper feed roller 152*a*. If the first paper feed roller 151*a* rotates counterclockwise in FIG. 4 driven by a driving device, the top recording medium P in the first paper cassette 151 is fed toward a paper feed path 153 extending vertically on the right side of the cassette in FIG. 4. Similarly, when the second paper feed roller 152*a* rotates counterclockwise in FIG. 4 driven by a driving device, the top recording medium P in the second paper cassette 152 is fed toward the paper feed path 153.

Within the paper feed path 153, multiple pairs of conveying rollers 154 are disposed. The recording medium P fed into the paper feed path 153 is conveyed from the lower side to the upper side in FIG. 4 while being sandwiched between these pairs of conveying rollers 154.

At the downstream end of the conveying direction in the paper feed path 153, a pair of registration rollers 55 are arranged. The pair of registration rollers 55 temporarily stop the rotation of both rollers as soon as the recording medium P sent from the pair of the conveying rollers 154 arrives. Then they feed out the recording medium P to a secondary transfer nip described later at an appropriate timing.

Figure 5:
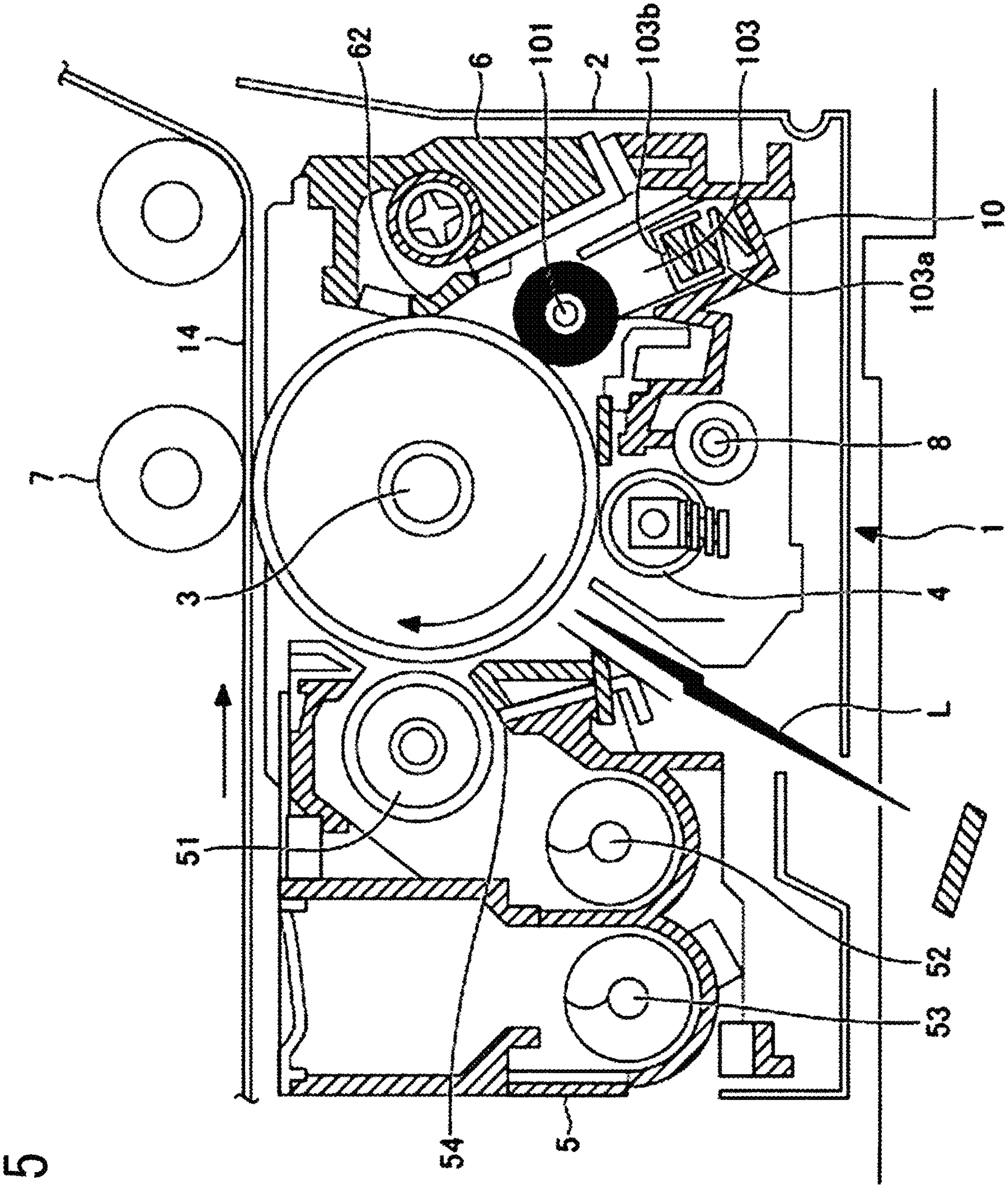
FIG. 5 is a schematic diagram illustrating a cross-sectional image of an example of the imaging unit of the image forming apparatus illustrated in FIG. 4.

FIG. 5 is a schematic cross-sectional view of an example of an image forming unit in an image forming apparatus according to one embodiment of the present disclosure and illustrates an example of the configuration of one of the four image forming units 1Y, 1C, 1M, and 1K illustrated in FIG. 4.

As illustrated in FIG. 5, the image forming unit 1 includes a drum-shaped image bearer 3 as an image bearer. Although the image bearer 3 has a drum-like shape, it may employ a sheet-like shape or an endless belt shape.

Arranged around the image bearer 3 are a charging roller 4, a developing unit 5, a primary transfer roller 7, a cleaning device 6, a lubricant application device 10, and a discharging (quenching) lamp. The charging roller 4 is a component of the charging device, serving as the charging unit, while the developing unit 5 functions as a developing device to tonerize latent electrostatic images formed on the surface of the image bearer 3. The primary transfer roller 7 serves as a primary transfer member of a primary transfer device that transfers toner images on the surface of the image bearer 3 to an intermediate transfer belt 14. The cleaning device 6 removes residual toner on the surface of the image bearer 3 after transferring toner images to the intermediate transfer belt 14. The lubricant application device 10 applies lubricant to the surface of the image bearer 3 after cleaning by the cleaning device 6. The quenching lamp functions as a quenching device to quench (discharge) the surface potential of the image bearer 3 after cleaning.

The charging roller 4 is provided around the image bearer 3 with a predetermined gap, and it charges the image bearer 3 with a predetermined polarity and a predetermined voltage. The surface of the image bearer 3 uniformly charged by the charger 4 is exposed to the light beam L emitted from the optical writing unit 40 as a latent electrostatic image forming device based on image information to form a latent electrostatic image on the image bearer 3.

The developing unit 5 has a developing roller 51 as a developing agent bearer. A development bias is applied to the developing roller 51 by a power source. A supply screw 52 and a stirring screw 53 are provided that stir a developing agent accommodated in the casing of the developing unit 5 while transferring the developing agent in the opposite direction to each other. In addition, a doctor blade 54 is provided to regulate the layer thickness of the developing agent borne on the developing roller 51. The toner contained in the developing agent stirred and transferred by the two screws of the supply screw 52 and the stirring screw 53 is charged with a predetermined polarity. The developing agent is then scooped up to the surface of the developing roller 51 and regulated by the doctor blade 54, allowing the toner to be attached to the latent electrostatic image on the image bearer 3 in the developing region facing the image bearer 3.

The cleaning device 6 includes a fur brush 101 and a cleaning blade 62. The cleaning blade 62 contacts the image bearer 3 in the counter direction to the movement of the surface of the image bearer 3. The detail of the cleaning blade 62 is the same as described above.

The lubricant application device 10 includes a solid lubricant 103, a lubricant pressing spring 103*a*, and a fur brush 101, which is used as an application brush to apply the solid lubricant 103 to the image bearer 3. The solid lubricant 103 is held by a bracket 103*b* and pressed toward the fur brush 101 side by the lubricant pressing spring 103*a*. The solid lubricant 103 is scraped off by the fur brush 101 that is driven to rotate by the image bearer 3 to apply the lubricant to the image bearer 3. The lubricant applied to the image bearer 3 maintains the friction coefficient of the surface of the image bearer 3 at or below 0.2 during non-image forming.

The charging device employs a non-contact proximity arrangement method where the charging roller 4 is placed close to the image bearer 3 without direct contact. As for the charging device, known configurations such as corotron, scorotron, and solid-state charger can be used. Among these charging methods, particularly contact charging methods or non-contact proximity arrangement methods are more desirable, as they offer advantages such as higher charging efficiency, lower ozone generation, and the possibility of device miniaturization.

The light sources of the laser beam L in the optical writing unit 40, as well as the light sources such as the discharging lamp, can utilize various luminous articles, including fluorescent lamps, tungsten lamps, halogen lamps, mercury lamps, sodium lamps, light-emitting diodes (LEDs), semiconductor lasers (LDs), and electroluminescence (EL).

In addition, various types of optical filters, for example, a sharp cut filter, a band-pass filter, a near infrared filter, a dichroic filter, a coherent filter and a color conversion filter, can be used to irradiate the image bearer 3 with the desired wavelength range of light.

Among these light sources, light-emitting diodes and semiconductor lasers are particularly suitable due to their high irradiation energy and their emission of long-wavelength light in the range of 600 to 800 nm.

The transfer unit 60, functioning as a transfer device illustrated in FIG. 4, includes not only the intermediate transfer belt 14 but also a belt cleaning unit 162, a first bracket 63, and a second bracket 64. Additionally, it includes four primary transfer rollers 7Y, 7C, 7M, and 7K, a secondary transfer backup roller 66, a drive roller 67, an auxiliary roller 68, and a tension roller 69. The intermediate transfer belt 14 is tensioned across these eight roller components and is driven counterclockwise in FIG. 4 by the rotation of the drive roller 67. The four primary transfer rollers 7Y, 7C, 7M, and 7K each form a primary transfer nip by sandwiching the intermediate transfer belt 14 moving in an endless manner between themselves and the image bearers 3Y, 3C, 3M, and 3K, respectively. Then a transfer bias of opposite polarity (e.g., positive) to the toner is applied to the backside (loop inner surface) of the intermediate transfer belt 14. As the intermediate transfer belt 14 moves endlessly, sequentially passing through primary transfer nips for Y, C, M, and K, the Y, C, M, and K toner images on each image bearer 3Y, 3C, 3M, and 3K are superimposed and transferred onto its surface. Thus, a four-color overlapping toner image (hereinafter referred to as a four-color toner image) is formed on the intermediate transfer belt 14.

The intermediate transfer belt 14 may also include an elastic intermediate transfer belt. The elastic intermediate transfer belt can have a structure in which a flexible elastic layer is laminated on a relatively rigid base layer with sufficient bendability.

Additionally, to prevent the intermediate transfer belt 14 from meandering, a guide member may be provided on its inner peripheral surface.

The secondary transfer backup roller 66 forms a secondary transfer nip by sandwiching the intermediate transfer belt 14 between itself and the secondary transfer roller 70, which is arranged on the outside of the loop of the intermediate transfer belt 14. The pair of registration rollers 55 sends out the recording medium P sandwiched between the rollers towards the secondary transfer nip at a timing synchronized with the four-color toner image on the intermediate transfer belt 14. Due to the secondary transfer electric field formed between the secondary transfer roller 70 to which the secondary transfer bias is applied and the secondary transfer backup roller 66, as well as the pressure within the nip, the four-color toner image on the intermediate transfer belt 14 is collectively secondarily transferred onto the recording medium P within the secondary transfer nip. This secondarily transferred image forms a full-color toner image when combined with the white color of the recording medium P.

After passing through the secondary transfer nip, residual toner that was not transferred to the recording medium P adheres to the intermediate transfer belt 14. This residual toner is cleaned by the belt cleaning unit 162. The belt cleaning unit 162 includes the belt cleaning blade 162*a*, which is brought into contact with the front surface of the intermediate transfer belt 14, thereby scraping off and removing the residual toner from the intermediate transfer belt 14. The belt cleaning unit 162 may optionally be provided with a collecting device to receive toner and other residues removed by the cleaning blade or a lubricant application device. A structure such as a dish-shaped tray can be used as the collecting device.

The first bracket 63 of the transfer unit 60 is designed to oscillate at a predetermined rotation angle around the rotation axis of the auxiliary roller 68 in response to the on/off operation of a solenoid. When forming monochrome images, the image forming apparatus 500 rotates the first bracket 63 slightly counterclockwise in FIG. 4 by driving the solenoid mentioned above. This rotation causes the primary transfer rollers 7Y, 7C, and 7M for Y, C, and M, respectively, to revolve counterclockwise around the rotational axis of the auxiliary roller 68, as illustrated in FIG. 4. Consequently, the intermediate transfer belt 14 is separated from the image bearers 3Y, 3C, and 3M for Y, C, and M, respectively. Then only the image forming unit 1K for K among the four image forming units 1Y, 1M, 1C, and 1K to form a monochrome image. This operation prevents unnecessary wear and tear on the components of each image forming unit 1 by avoiding the operation of the image forming units for Y, C, and M during monochrome image formation.

Above the secondary transfer nip in FIG. 4, the fixing unit 80 is arranged. The fixing unit 80 includes a pressure heating roller 81 containing a heat source such as a halogen lamp, along with a fixing belt unit 82. The fixing belt unit 82 includes a fixing belt 84 as a fixing member, a heating roller 83 containing a heat source such as a halogen lamp, a tension roller 85, a drive roller 86, and a temperature sensor. The fixing belt 84 with no end is tensioned by the heating roller 83, tension roller 85, and drive roller 86 while being looped, allowing it to move counterclockwise in FIG. 4. During this endless movement, the fixing belt 84 is heated from the backside by the heating roller 83. The pressure heating roller 81, driven to rotate clockwise in FIG. 4, presses against the front side at the location where the fixing belt 84 contacts the heating roller 83. As a result, a fixing nip is formed where the pressure heating roller 81 and the fixing belt 84 come into contact.

Outside the loop of the fixing belt 84, a temperature sensor is arranged facing the outer surface of the fixing belt 84 with a predetermined gap to detect the surface temperature of the fixing belt 84 just before the fixing belt 84 enters the fixing nip. This detection result is transmitted to a fixing power supply circuit. Based on the detection result from the temperature sensor, the fixing power supply circuit switches on and off the supply of power by heating sources disposed within the heating roller 83 and the pressure heating roller 81.

The recording medium P that has passed through the above-mentioned secondary transfer nip is sent to the fixing unit 80 after being separated from the intermediate transfer belt 14. As it is conveyed from the lower side to the upper side within the fixing unit 80 as illustrated in FIG. 4 while being sandwiched by the fixing nip, the full-color toner image is heated and pressed onto the recording medium P by the fixing belt 84, which fixes the toner image on the recording medium P.

The recording medium P, with the fixed toner image on it, is ejected from the image-forming apparatus through a pair of sheet-ejecting rollers 87. A stacking portion 88 is formed on the upper surface of the housing of the image-forming apparatus 500, where the recording medium P, ejected through the pair of sheet-ejecting rollers 87, is sequentially stacked.

Above the transfer unit 60, four toner cartridges 100Y, 100C, 100M, and 100K, which house Y, C, M, and K toner, respectively, are arranged. The Y, C, M, and K toners in the toner cartridges 100Y, 100C, 100M, and 100K are appropriately supplied to the developing units 5Y, 5C, 5M, and 5K of the image forming units 1Y, 1C, 1M, and 1K, respectively. These toner cartridges 100Y, 100C, 100M, and 100K are detachably attachable from the image forming apparatus independently of the image forming units 1Y, 1C, 1M, and 1K.

The image forming operation of the image forming apparatus 500 is described next.

Upon receiving a print execution signal from the operation unit or a similar source, a predetermined voltage or current is sequentially applied to the charging roller 4 and the developing roller 51 illustrated in FIG. 5 at specified timings. Similarly, a predetermined voltage or current is sequentially applied to light sources, such as the optical writing unit 40 shown in FIG. 4 and the quenching lamp, at specified timings. Additionally, synchronized with this application, the image bearers 3 (3Y, 3C, 3M, 3K) are rotationally driven in the directions indicated by the arrows in FIGS. 4 and 5, by an image bearer driving motor functioning as a driving device.

As the image bearer 3 rotates in the direction of the arrow shown in FIG. 5, its surface is uniformly charged to a predetermined potential by the charging roller 4. The optical writing unit 40 emits beams of light L corresponding to image information to the image bearer 3, quenching (discharging) the irradiated portion of the image bearer 3 to form a latent electrostatic image.

The surface of the image bearer 3, where the latent electrostatic image is formed, is brought into contact with a magnetic brush of the developing agent on the developing roller 51 at a position facing the developing unit 5. At this stage, the negatively charged toner on the developing roller 51 moves toward the latent electrostatic image under the influence of a predetermined development bias applied to the developing roller 51, thereby forming a toner image (development). In each of the image-forming units 1Y, 1C, 1M, and 1K shown in FIG. 4, the same image forming process as that of the image forming unit 1 in FIG. 5 is performed, producing toner images of each color on the surfaces of the image bearers 3Y, 3C, 3M, and 3K of the respective image forming units 1Y, 1C, 1M, and 1K.

In the image forming apparatus 500, the latent electrostatic image formed on the image bearer 3 is developed using negatively charged toner by the developing device 5, in a reversal development process. In this embodiment, an example using a non-contact charging roller system of N/P (negative/positive: toner adheres to low potential areas) has been described, but the present invention is not limited thereto.

Each color toner image formed on the surface of each image bearer 3Y, 3C, 3M, and 3K is sequentially transferred and overlaid onto the surface of the intermediate transfer belt 14. Consequently, a four-color toner image is formed on the intermediate transfer belt 14.

The four-color toner image formed on the intermediate transfer belt 14 is transferred onto the recording medium P, which is fed from either the first paper cassette 151 or the second paper cassette 152 and passes between the rollers of the pair of registration rollers 55 before being fed into the secondary transfer nip. At this stage, the recording medium P is temporarily stopped between the registration rollers 55 to synchronize its leading edge with the front edge of the image on the intermediate transfer belt 14. It is then fed into the secondary transfer nip. Subsequently, the recording medium P, now carrying the toner image, is separated from the intermediate transfer belt 14 and conveyed to the fixing unit 80. As the recording medium P passes through the fixing unit 80, heat and pressure fix the toner image onto it. Finally, the recording medium P is ejected from the image forming apparatus 500 and stacked in the stacking portion 88.

The surface of the intermediate transfer belt 14, from which the toner image has been transferred onto the recording medium P at the secondary transfer nip, is cleaned by a belt cleaning unit 162 to remove any residual toner remaining on the surface.

Similarly, the surface of the image bearer 3, from which the toner images of each color were transferred onto the intermediate transfer belt 14 at the primary transfer nip, is cleaned by a cleaning device 6 to remove any residual toner after transfer. After cleaning, lubricant is applied by a lubricant application device 10, and the surface is discharged by a quenching lamp.

As illustrated in FIG. 5, each imaging unit 1 of the image forming apparatus 500 includes components such as the image bearer 3 and processing devices like the charging roller 4, the developing unit 5, the cleaning device 6, and the lubricant application device 10, all housed within a housing 2. Additionally, the imaging unit 1 is designed as an integrally detachable process cartridge for the image forming apparatus 500. In the image forming apparatus 500, the imaging unit 1, including the image bearer 3 and processing devices, can be replaced as a single unit (process cartridge). However, it can also be configured to allow replacement of individual components, such as the image bearer 3, the charging roller 4, a charging roller cleaner 8, the developing unit 5, cleaning device 6, and the lubricant application device 10.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described next in detail with reference to Examples and Comparative Examples but is not limited to these Examples. "Parts" represents percent by mass unless otherwise specified.

The elastic cleaning blade substrate illustrated in FIG. 3 with an elastic edge layer and a base layer.

Preparation of Particle Dispersion for Forming Coating Layer

Preparation of Particle Dispersion A

Particle dispersion A was prepared by placing 6.8 parts of polytetrafluoroethylene (PTFE) micro powder (TF9201Z, available from 3M Company, with a volume average particle size of 200 nm) as particles, 0.2 parts of a terpolymer of VdF-HFP-TFE consisting of vinylidene fluoride (VdF), hexafluoropropylene (HFP), and tetrafluoroethylene (TFE) as a binding component, and 93.0 parts of 1,1,2,2-tetrafluoroethyl 2,2,2-trifluoroethyl ether (HFE-347; available from Tokyo Chemical Industry Co. Ltd.) as a fluorine solvent dispersion, into a screw tube, followed by stirring with a stirrer.

Preparation of Particle Dispersion B

Particle dispersion B was prepared by placing 6.9 parts of polytetrafluoroethylene (PTFE) micro powder (TF9201Z, available from 3M Company, with a volume average particle size of 200 nm) as particles, 0.1 parts of a terpolymer of VdF-HFP-TFE as a binding component, and 93.0 parts of 1,1,2,2-tetrafluoroethyl 2,2,2-trifluoroethyl ether (HFE-347; available from Tokyo Chemical Industry Co. Ltd.) as a fluorine solvent dispersion, into a screw tube, followed by stirring with a stirrer.

Preparation of Particle Dispersion C

Particle dispersion C was prepared by placing 5.8 parts of polytetrafluoroethylene (PTFE) micro powder (TF9201Z, available from 3M Company, with a volume average particle size of 200 nm) as particles, 1.2 parts of a terpolymer of VdF-HFP-TFE as a binding component, and 93.0 parts of 1,1,2,2-tetrafluoroethyl 2,2,2-trifluoroethyl ether (HFE-347; available from Tokyo Chemical Industry Co. Ltd.) as a fluorine solvent dispersion, into a screw tube, followed by stirring with a stirrer.

Preparation of Particle Dispersion D

Particle Dispersion D was prepared by placing 97.0 parts of a water dispersion of polymethyl methacrylate (PMMA) particles (MX100W, available from NIPPON SHOKUBAI CO., LTD., with a volume average particle size of 150 nm) and 3.0 parts of polyvinyl butyral (PVB) resin (Eslec KW-10, available from SEKISUI CHEMICAL CO., LTD., with an acetalization degree of 9±2 mol) as a binding component into a screw tube and stirring with a stirrer or similar device.

Preparation of Particle Dispersion E

Particle Dispersion E was prepared by placing 95.0 parts of a water dispersion of polymethyl methacrylate (PMMA) particles (MX100W, available from NIPPON SHOKUBAI CO., LTD., with a volume average particle size of 150 nm) and 5.0 parts of polyvinyl alcohol (PVA) resin (Poval JP-03, available from JAPAN VAM & POVAL CO., LTD., with a saponification degree of 88±2 mol) as a binding component into a screw tube and stirring with a stirrer or similar device.

Example 1

Preparation of Blade Substrate in Cleaning Blade

For the edge layer and the base layer, a polyurethane elastomer sheet obtained by centrifugal molding, curing, and post-crosslinking was used. The average thickness and Martens hardness (HM) of the edge layer and the base layer are as follows:

Average thickness: 2.0 (mm)

Martens hardness (HM) of the edge layer: 0.5 (N/mm$^2$)

Martens hardness (HM) of the base layer: 1.1 (N/mm$^2$)

The blade substrate was prepared by bonding the edge layer and the base layer. Additionally, the blade substrate was attached to a metal plate.

Dipping

Figure 6:
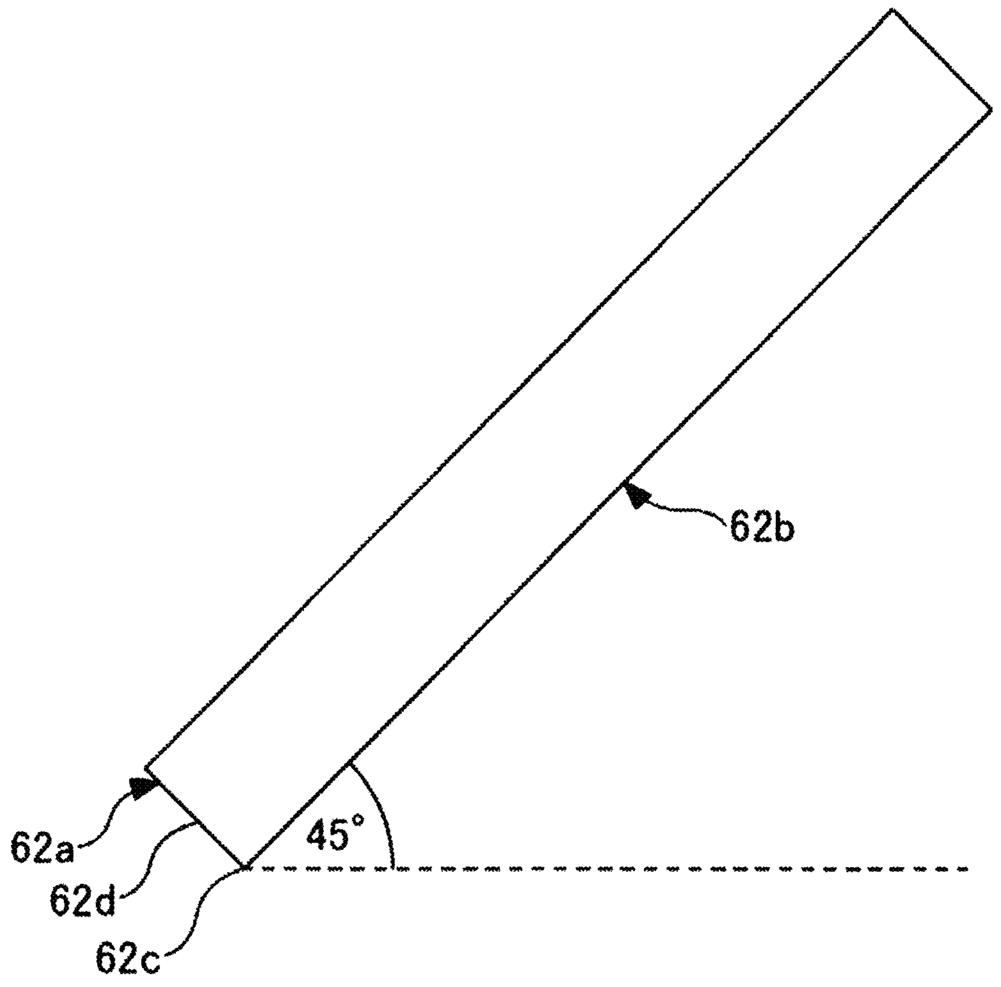
FIG. 6 is a schematic diagram illustrating the method of manufacturing a coating layer performed in Examples described later.

One end surface of the cleaning blade, used as the front edge on the peripheral side (hereinafter referred to as the cleaning blade front edge surface), was immersed perpendicularly to the horizontal plane into Particle Dispersion A to a depth of 2 (mm) from the cleaning blade front edge surface and then withdrawn at a withdrawal speed of 1 (mm/s). To collect PTFE particles necessary for the cleaning performance on the portion including the contact edge of the cleaning blade front edge surface, the blade was tilted approximately 45 degrees as illustrated in FIG. 6 and dried at room temperature (25 degrees Celsius) for 30 minutes, thereby fabricating the cleaning blade of Example 1.

Examples 2 to 7 and Comparative Examples 1 to 3

Cleaning blades of Examples 2 to 7 and Comparative Examples 1 to 3 were fabricated in the same manner as in Example 1, except that the type of particle dispersion, the Martens hardness of the base layer, and the average thickness of the coating layer were modified as shown in Table 1.

The thickness of the coating layer was adjusted by the withdrawal speed during dipping. Increasing the withdrawal speed results in an increased thickness.

In Comparative Example 1, the cleaning blade had a blade substrate without a coating layer.

Assembly of Image Forming Apparatus

The cleaning blades obtained from Examples 1 to 7 and Comparative Examples 1 to 3 were installed in the image bearer unit of a color multifunction peripheral (imagio MP C4500, available from Ricoh Co., Ltd.) (with a printer section similar in structure to the image forming apparatus 500 illustrated in FIG. 4), and the image forming apparatus was thus assembled. The cleaning blade was attached to the image forming apparatus at a line pressure of 20 g/cm and a cleaning angle of 81 degrees.

Measurement of Maximum Penetration Depth Hmax of Indenter

The maximum penetration depth hmax of the indenter for the edge layers of the cleaning blades obtained from Examples 1 to 7 and Comparative Examples 1 to 3 was measured. The method of measuring hmax was executed as described in the earlier section, "Measurement of Maximum Penetration Depth hmax of Indenter." The hmax values shown in Table 1 represent the median of measurements taken at 4 to 6 points at each measurement location.

Measurement of Martens Hardness

The Martens hardness of the base layers of the cleaning blades obtained from Examples 1 to 7 and Comparative Examples 1 to 3 was measured. The measurement conditions for the Martens hardness (HM) were the same as those for the measurement of the maximum penetration depth (hmax) described earlier. The results are shown in Table 1. The measurement locations for the Martens hardness of the base layer were at a distance of 100 μm from the end of the base layer. The Martens hardness values represent the median of measurements taken at 4 to 6 points at each measurement location.

Measurement of Average Coating Layer Thickness

The average thickness of the coating layers of the cleaning blades obtained from Examples 1 to 7 and Comparative Examples 1 to 3 was measured. The results are shown in Table 1. The measurement method involved removing part of the coating layer using a spatula or cotton swab and performing shape measurement using a contact-type surface roughness tester (SurfTest SJ-500, available from Mitutoyo).

Evaluation on Torque Increase Rate

The assembled image forming apparatus was used to output prints under the following conditions, and the rate of change in the driving torque increase of the image bearer was measured. After printing, the front edge (front end) of the cleaning blade was observed using a laser microscope (LEXT OLS4500, available from Olympus Corporation), and the torque increase rate was evaluated based on the following evaluation criteria. The evaluation results are listed in Tables 1 to 3. The term "initial" in the evaluation criteria refers to the period during which the first 500 sheets are output.

Environment: 23 degrees Celsius/45 percent RH

Paper conditions: blank paper chart

Number of prints: 5,000 sheets (A4 size, horizontal orientation)

Evaluation Criteria

S: The rate of change in torque increase is within 50 compared to the initial stage, and there is no stalling of the image bearer caused by the increase in driving torque. Furthermore, no traces of turning-up were observed on the cleaning blade edge after output.

A: The rate of change in torque increase is within 50 compared to the initial stage, and there is no stalling of the image bearer caused by the increase in driving torque. However, traces of peeling were observed on the cleaning blade front edge after output, but they were not significant enough to cause toner to slip through, making it acceptable for practical use.

C: The image bearer stalled due to the increase in torque, and traces of turning-up sufficient to cause toner to slip through were observed on the cleaning blade front edge after output, making it unacceptable for practical use.

Image Quality Evaluation (Cleaning Performance)

The assembled image forming apparatus was used to output prints under the following conditions. Subsequently, the front edge of the cleaning blade and the surface of the image bearer were observed using a laser microscope (LEXT OLS4500, available from Olympus Corporation), and evaluations were made based on the following criteria. The evaluation results are listed in Tables 1 and 2.

Environment: 27 degrees Celsius/80 percent RH

Paper conditions: continuous full solid images

Number of prints: 2,000 sheets (A4 size, horizontal orientation)

Evaluation Criteria

S: Toner that failed to be stopped properly and slipped through was not visually detectable on the printed paper or the image bearer. Even under microscopic observation of the image bearer in the longitudinal direction, no streaks of toner were detected.

A: Toner that failed to be stopped properly and slipped through was not visually detectable on the printed paper or the image bearer. However, microscopic observation of the image bearer in the longitudinal direction revealed streaks of toner that had passed through.

C: Toner that failed to be stopped properly and slipped through was visually detectable on the printed paper or the image bearer.

TABLE 1

| | | | Example | | | | | | |
|---|---|---|---|---|---|---|---|---|---|
| | | | 1 | 2 | 3 | 4 | 5 | 6 | 7 |
| Coating layer | Particle dispersion for forming coating layer | | A | B | C | A | B | D | E |
| | Particle | PTFE (particle size: 200 nm | 6.8 | 69 | 5.8 | 6.8 | 6.9 | | |
| | | PMMA (particle size: 150 nm | — | — | — | — | — | 97.0 | 95.0 |
| | binding component | VdF-HFP-TFE | 0.2 | 0.1 | 1.2 | 0.2 | 0.1 | — | — |
| | | Polyvinylbutyral | — | — | — | — | — | 3.0 | — |
| | | Polyvinyl alcohol | — | — | — | — | — | — | 5.0 |
| | Dispersion solvent | 1,1,2,2-Tetrafluoroethyl-2,2,2-trifluroethyl ether | 93.0 | 93.0 | 93.0 | 93.0 | 93.0 | 92.0 | 92.0 |
| | Average thickness (μm) | | 0.5 | 6.5 | 4 | 4.0 | 10.0 | 7.5 | 7.0 |
| Blade substrate | Martens hardness (N/mm$^2$) in base layer | | 1.1 | 2.0 | 2.0 | 0.5 | 1.5 | 0.5 | 0.5 |
| Evaluation | Maximum penetration depth hmax (μm) of indenter in edge layer | | 4.0 | 7.7 | 4.5 | 7.0 | 10.0 | 8.2 | 9.0 |
| | Torque increase rate | | A | S | A | S | S | A | A |
| | Cleaning performance | | S | A | A | S | A | A | A |

| | | | Comparative Example | | |
|---|---|---|---|---|---|
| | | | 1 | 2 | 3 |
| Coating layer | Particle dispersion for forming coating layer | | — | B | C |
| | Particle | PTFE (particle size: 200 nm | — | 6.9 | 5.8 |
| | | PMMA (particle size: 150 nm | — | — | — |
| | binding component | VdF-HFP-TFE | — | 0.1 | 1.2 |
| | | Polyvinylbutyral | — | — | — |
| | | Polyvinyl alcohol | — | — | — |
| | Dispersion solvent | 1,1,2,2-Tetrafluoroethyl-2,2,2-trifluoro-ethyl ether | — | 93.0 | 93.0 |
| | Average thickness (μm) | | — | 10.5 | 0.5 |
| Blade substrate | Martens hardness (N/mm$^2$) in base layer | | 2.0 | 0.5 | 2.0 |
| Evaluation | Maximum penetration depth hmax (μm) of indenter in edge layer | | 3.0 | 10.5 | 3.5 |
| | Torque increase rate | | C | A | C |
| | Cleaning performance | | S | C | A |

Aspects of the present disclosure are, for example, as follows.

Aspect 1:

An image forming apparatus includes an image bearer, a charging device to charge a surface of the image bearer, an irradiator to irradiate the surface of the image bearer charged to form a latent electrostatic image, a developing device to develop the latent electrostatic image to form a toner image, a transfer device to transfer the toner image to a recording medium, a fixing device to fix the toner image transferred to the recording medium, and a cleaning device that includes a cleaning blade including an elastic cleaning blade substrate including a front end portion, a front edge ridge part, and an undersurface, an edge layer, a coating layer disposed on the front end portion, the coating layer being in contact with the surface of the image bearer to remove residual matter on the surface of the image bearer, and a cleaning blade supporting member to support the elastic cleaning blade substrate, wherein the maximum penetration depth hmax of an indenter of a microhardness tester is between 4.0 μm and 10.0 μm at a position 100 μm inward from the front edge ridge part on the undersurface of the elastic cleaning blade substrate as measured according to a nanoindentation hardness test.

Aspect 2:

The image forming apparatus according to Aspect 1 mentioned above, wherein the maximum penetration depth hmax is between 5.5 μm and 7.5 μm.

Aspect 3:

The image forming apparatus according to Aspect 1 or 2, wherein the coating layer has a thickness between 0.5 μm and 10 μm at the position 100 μm inward from the front edge ridge part.

Aspect 4:

The image forming apparatus according to any one of Aspects 1 to 3 mentioned above, wherein the coating layer contains particles and a resin binding the particles with the elastic cleaning blade substrate.

Aspect 5:

The image forming apparatus according to any one of Aspects 1 to 4 mentioned above, wherein the coating layer includes an applied film including PTFE particles and a fluororesin or acrylic particles and polyvinyl alcohol resin or polyvinyl acetal resin.

Aspect 6:

The image forming apparatus according to any one of Aspects 1 to 5 mentioned above, wherein the elastic cleaning blade substrate has a single layer structure of polyurethane rubber or a laminate structure of polyurethane rubber with different Martens hardness.

Aspect 7:

The image forming apparatus according to Aspect 6 mentioned above, wherein the elastic cleaning blade substrate has the single layer structure and the polyurethane rubber has a Martens hardness between 0.5 $N/mm^2$ and 2 $N/mm^2$.

Aspect 8:

A process cartridge includes an image bearer and a cleaning device that includes a cleaning blade including an elastic cleaning blade substrate including a front end portion, a front edge ridge part, an undersurface, an edge layer, a coating layer disposed on the front end portion, the coating layer being in contact with the surface of the image bearer to remove residual matter on the surface of the image bearer, and a cleaning blade supporting member to support the elastic cleaning blade substrate, wherein the maximum penetration depth hmax of an indenter of a microhardness tester is between 4.0 μm and 10.0 μm at a position 100 μm inward from the front edge ridge part of the coating layer on the undersurface of the elastic cleaning blade substrate as measured according to a nanoindentation hardness test.

Aspect 9:

The process cartridge according to Aspect 8 further includes at least one of a charging device to charge a surface of the image bearer an irradiator to irradiate the surface of the image bearer charged to form a latent electrostatic image, a developing device to develop the latent electrostatic image to form a toner image, and a transfer device to transfer the toner image to a recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:
- an image bearer;
- a charger to charge a surface of the image bearer;
- an irradiator to irradiate the surface of the image bearer charged to form a latent electrostatic image;
- a developer to develop the latent electrostatic image to form a toner image;
- a transferer to transfer the toner image to a recording medium;
- a fixer to fix the toner image transferred to the recording medium; and
- a cleaning device comprising:
  - a cleaning blade comprising:
    - an elastic cleaning blade substrate comprising:
      - a front end portion;
      - a front edge ridge part;
      - an undersurface;
      - an edge layer; and
      - a coating layer disposed on the front end portion, the coating layer being in contact with the surface of the image bearer to clean the surface of the image bearer; and
    - a cleaning blade supporting member to support the elastic cleaning blade substrate,
  - wherein a maximum penetration depth hmax of an indenter of a microhardness tester is between 4.0 μm and 10.0 μm at a position 100 μm inward from the front edge ridge part on the undersurface of the elastic cleaning blade substrate as measured according to a nanoindentation hardness test in accordance with ISO 14577 and pressing the indenter under a load of 1,000 μN over 10 seconds, holding the load for 5 seconds, and then releasing the load over 10 seconds at the same loading rate such that the hmax is defined as the depth of the indenter immediately after the 5-second holding period.

2. The image forming apparatus according to claim 1, wherein the maximum penetration depth hmax is between 5.5 μm and 7.5 μm.

3. The image forming apparatus according to claim 1, wherein the coating layer has a thickness between 0.5 μm and 10 μm at the position 100 μm inward from the front edge ridge part.

4. The image forming apparatus according to claim 1, wherein the coating layer comprises particles and a resin binding the particles with the elastic cleaning blade substrate.

5. The image forming apparatus according to claim 1, wherein the coating layer comprises an applied film comprising:

PTFE particles and a fluororesin, or acrylic particles and either polyvinyl alcohol resin or polyvinyl acetal resin.

6. The image forming apparatus according to claim 1, wherein the elastic cleaning blade substrate has a single layer structure of polyurethane rubber or a laminate structure of polyurethane rubber with different Martens hardness.

7. The image forming apparatus according to claim 6, wherein the elastic cleaning blade substrate has the single layer structure and the polyurethane rubber has a Martens hardness between 0.5 $N/mm^2$ and 2 $N/mm^2$.

8. A process cartridge comprising:

an image bearer; and a cleaning device comprising:

a cleaning blade comprising:

an elastic cleaning blade substrate comprising:

a front end portion;

a front edge ridge part;

an undersurface;

an edge layer; and a coating layer disposed on the front end portion, the coating layer being in contact with a surface of the image bearer to clean the surface of the image bearer; and a cleaning blade supporting member to support the elastic cleaning blade substrate, wherein a maximum penetration depth hmax of an indenter of a microhardness tester is between 4.0 μm and 10.0 μm at a position 100 μm inward from the front edge ridge part on the undersurface of the elastic cleaning blade substrate as measured according to a nanoindentation hardness test in accordance with ISO 14577 and pressing the indenter under a load of 1,000 μN over 10 seconds, holding the load for 5 seconds, and then releasing the load over 10 seconds at the same loading rate such that the hmax is defined as the depth of the indenter immediately after the 5-second holding period.

9. The process cartridge according to claim 8, further comprising at least one of a charger to charge a surface of the image bearer, an irradiator to irradiate the surface of the image bearer charged to form a latent electrostatic image, a developer to develop the latent electrostatic image to form a toner image, or a transferer to transfer the toner image to a recording medium.

10. The image forming apparatus according to claim 1, wherein the maximum penetration depth hmax is between 7.0 μm and 10.0 μm.

11. The image forming apparatus according to claim 4, wherein the coating layer has a sea-island structure, and the resin binding the particles serves as a matrix in the sea-island structure.

12. The image forming apparatus according to claim 4, wherein the coating layer has a sea-island structure, and the particles serve as domains in the sea-island structure.

13. The image forming apparatus according to claim 4, wherein the particles have a volume average particle diameter of from 0.1 μm to 1 μm.

14. The image forming apparatus according to claim 4, wherein a content of the particles in the coating layer is from 80 percent by mass to 99 percent by mass of a total mass of the coating layer.

15. The image forming apparatus according to claim 1, wherein a line pressure applied by the elastic cleaning blade substrate onto the surface of the image bearer is between 10 N/m and 100 N/m.

16. The image forming apparatus according to claim 1, wherein an angle formed between a tangent of the image bearer at a position where the contact portion of the elastic cleaning blade substrate contacts the image bearer and a front surface of a free end of the elastic cleaning blade substrate is between 65 degrees and 85 degrees.

17. The image forming apparatus according to claim 5, wherein the coating layer comprises the applied film comprising the PTFE particles.

18. The image forming apparatus according to claim 5, wherein the coating layer comprises the applied film comprising the fluororesin, the fluororesin including a VdF-HFP-TFE terpolymer.

19. The image forming apparatus according to claim 1, wherein the image bearer is a layered organic photoconductor comprising a charge-generation layer and a charge-transport layer stacked on a substrate.

20. The process cartridge according to claim 8, wherein the maximum penetration depth hmax is between 7.0 μm and 10.0 μm.

* * * * *